July 7, 1936.  A. L. RICHE  2,047,131
MULTIPORT PLATE TYPE VALVE
Filed May 8, 1934  3 Sheets-Sheet 1
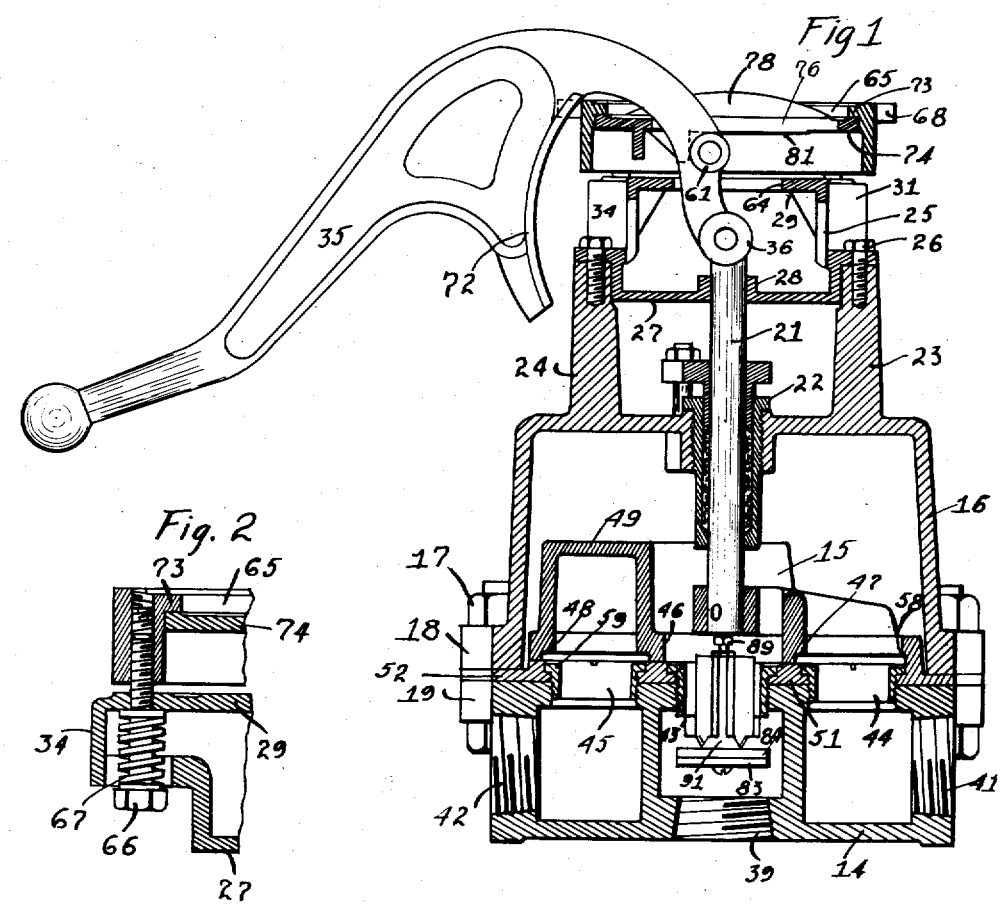
Inventor
Arthur L. Riche

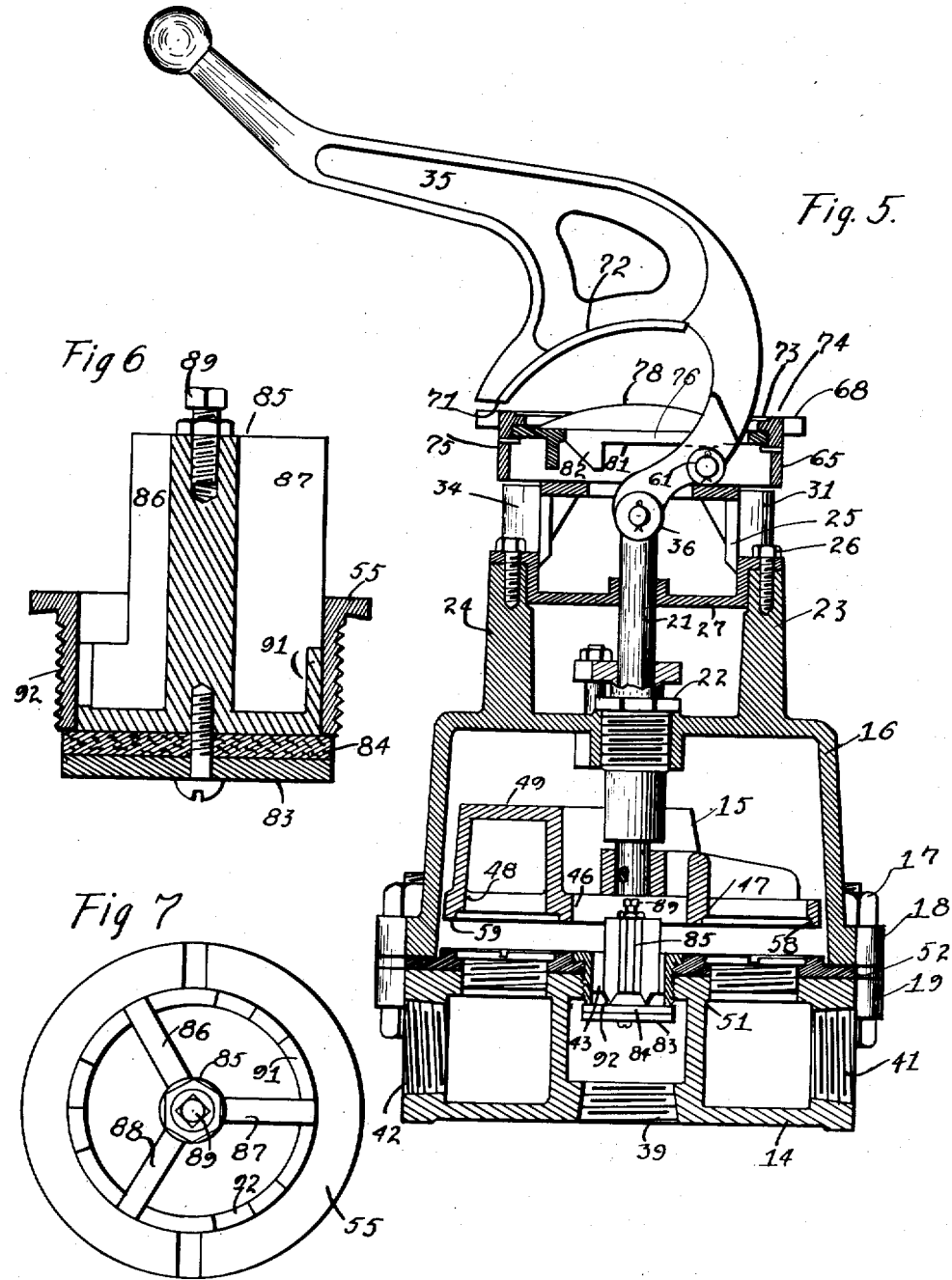

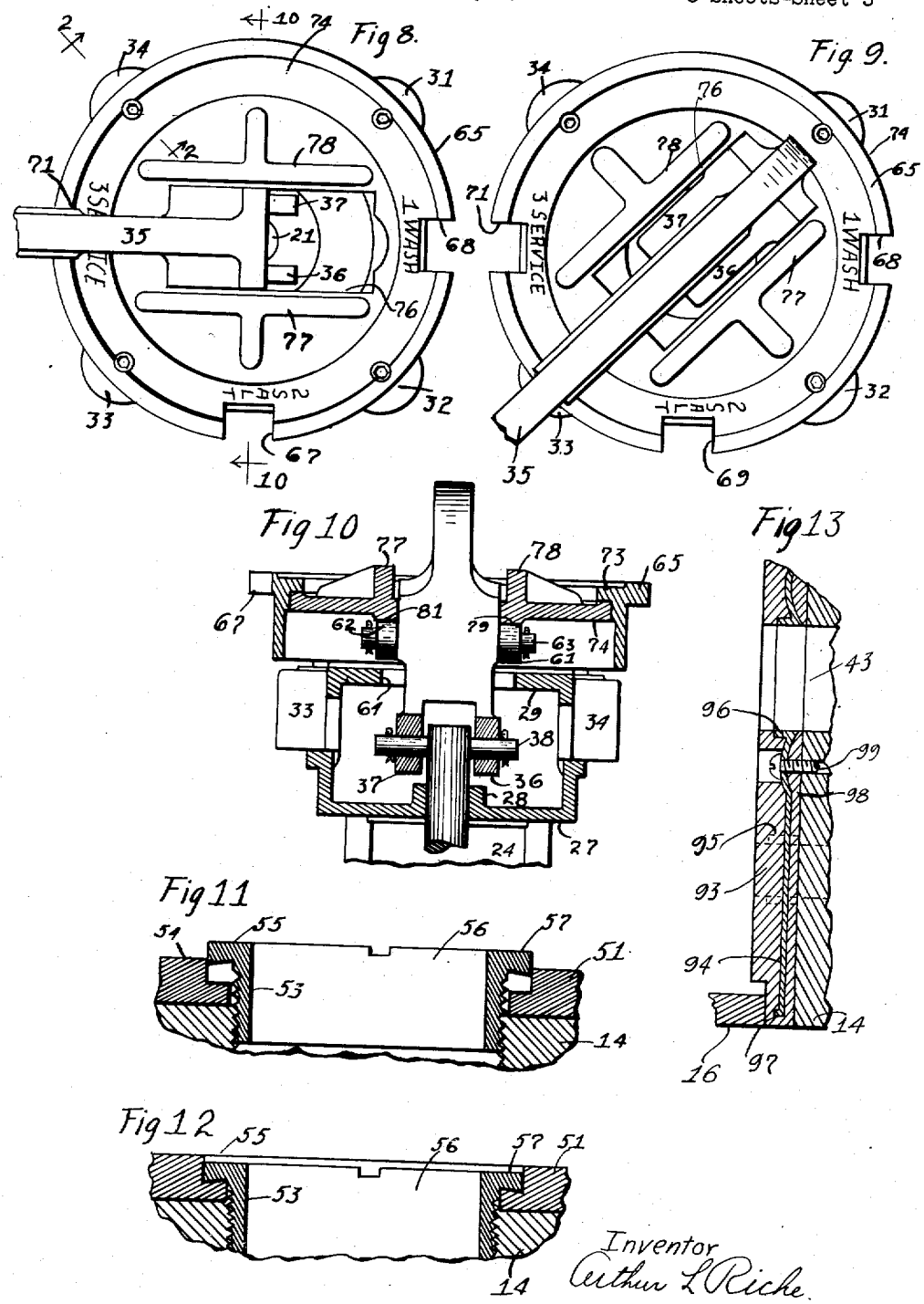

Patented July 7, 1936

2,047,131

UNITED STATES PATENT OFFICE 2,047,131

MULTIPORT PLATE TYPE VALVE

Arthur L. Riche, Freeport, Ill.

Application May 8, 1934, Serial No. 724,537

11 Claims. (Cl. 277—24)

This invention contemplates improvements in valve mechanisms of particular applicability to rotary plate-type valves.

An important object of the invention is to provide improved sealing means between the stationary and movable portion of the valve.

A further object of the invention is to provide a rotary plate-type valve having means for cutting off the flow of incoming liquid during the shifting of the valve from position to position.

I have also aimed to provide a rotary plate-type valve wherein spring means serve to urge the movable and stationary member together for sealing contact and wherein the spring pressure is relieved during the shifting of the movable member between its positions.

Another purpose of the invention is to provide a plate-type valve wherein spring means is located outside the valve for urging the valve elements together for ready accessibility to the springs and to keep the springs out of the fluid conducted through the valve.

I have also aimed to provide a plurality of springs located outside the valve housing whereby the action of the valve is not dependent upon a single spring which would render the valve inoperative in case of breakage.

Another purpose of the invention is to provide a plate-type valve wherein a resilient seat surrounds at least one port, and an aligning element is positioned in the port to maintain the port and seat in alignment and to prevent the material of the seat from shifting under pressure of the element seating thereon.

With these and other objects in mind, which will become apparent as the description proceeds, the invention is described in connection with the embodiment shown in the accompanying drawings wherein:

Fig. 1 is a vertical section through a valve embodying my invention showing the rotor member in the closed position;

Fig. 2 is a section on the line 2—2 of Fig. 8, showing the index ring in a position corresponding to Fig. 1;

Fig. 3 is a fragmentary section showing the lifting mechanism at an intermediate position;

Fig. 4 is a section of the line 2—2 of Fig. 8, showing the index ring in the position corresponding to Fig. 2 with the spring pressure relieved from the valve stem;

Fig. 5 is a vertical section showing the rotor member in the open position;

Fig. 6 is a vertical section through the cut off valve;

Fig. 7 is a top view of the cut off valve;

Fig. 8 is a top view of the valve showing the handle in the closed position;

Fig. 9 is a top view showing the valve in the open position with the handle midway between one of its closed positions;

Fig. 10 is a section on the line 10—10 of Fig. 8;

Fig. 11 is a fragmentary section through the stator, the seat and a port ferrule prior to the seating of the ferrule;

Fig. 12 is a section similar to Fig. 11 showing the ferrule seated; and

Fig. 13 is a fragmentary section through a modification of the seat or gasket.

The general valve structure is best shown in Fig. 1, wherein the number 14 designates generally the stator or body member of the valve, 15 the rotor or stem plate member of the valve, and 16 the valve housing or cover which is secured to the stator by means of a plurality of annularly spaced bolts 17 passing through ears 18 and 19 on the housing and stator respectively. The rotor 15 is carried on a valve stem 21 which extends through the housing, a packing gland 22 preventing leakage of liquid from the housing along the stem and permitting longitudinal and rotary motion of the stem. The housing has upstanding lugs 23 and 24 on opposite sides of stem 21 which carry a spring retainer and stem guide plate designated generally by the number 25 attached thereto by means of screws 26. This includes a stem guide 27 having a boss 28 through which the stem passes and within which it has bearing support against radial thrust. The plate also carries a platform 29 and a plurality of spring casings 31 to 34 presently to be more fully described. A handle 35 is attached to the outer end of the stem by means of a clevis having ears 36 and 37 and a pin 38 (Fig. 10) and serves to impart longitudinal and rotative movement thereto as will presently appear.

In the present embodiment, the valve is designed particularly for use in controlling the flow of fluids in a zeolite water softener and the stator 14 has a central threaded opening 39 which might be called a pressure port best used for incoming raw water and a plurality of radially positioned threaded openings such as shown at 41 and 42 for connection to pipes to conduct fluid into and out of the valve through a central port 43 and circumferentially spaced ports such as 44 and 45 in the face of the stator. The rotor 15 has similarly arranged ports such as 46 to 48 for directing the fluid within the valve. The ports are arranged in accordance with the flow desired. In this instance the rotor has a conduit 49 connecting the port 45 with a port not shown, while the ports 46 and 47 are open to the interior of the housing 10. The rotor is designed to be lifted by the stem 21 and rotated so as to selectively bring the ports of the rotor and stator into registration and thereby control the flow of liquid through the valve.

A seat or gasket 51 of resilient material such as rubber is positioned across the face of the stator and has an annular portion of smaller cross section extending between the stator and the housing as shown at 52 which serves as a gasket between these parts. This element serves as resilient seats against which the rotor member bears in the closed position thereof and functions in providing a seat or seal around each port. The seat consists in this instance of a solid piece of rubber having the annular portion 52 of lesser cross section and provided with openings, such as shown at 53, (Figs. 11 and 12) at each port of the stator. Annular recesses 54 are provided in the seat around each seat opening for the purpose of receiving collars 55 on threaded ferrules 56 which are received in the ports of the stator. The inner side of the collars 55 slopes inwardly as shown at 57 so that when the ferrules are turned down tightly against the bottom of the recesses as shown in Fig. 12, the rubber is pinched between the outer edge of the collar and the face of the stator and cannot creep away from the ferrule as the latter is tightened. The recesses 54 are in this instance of such depth that the upper edge of the ferrule is normally below the level of the seat. The ferrules serve a plurality of purposes; that of holding the seat firmly against the face of the stator at all times to seal the seat around each port; that of maintaining the openings in the seat in alignment with the stator ports; and that of preventing the resilient gasket from expanding into the ports under the pressure of the rotor as will presently appear.

The rotor member 15 is provided on its face with rims such as shown at 58 and 59 surrounding each port thereof adapted to bear against the seat 51 in the closed position of the rotor and which cooperate with the resilient seat to form a seal between rotor and the seat.

Referring now more particularly to the means for raising and rotating the rotor member, the handle 35 carries a pair of rollers 61 and 62 positioned on opposite sides thereof above the ears 36 and 37 and a pin 63 upon which the rollers are maintained for free rotation. The handle 35 passes through an opening 64 in the platform 29 and the rollers 61 and 62 are so spaced from the ears 36 and 37 that when the rotor occupies the closed position shown in Fig. 1 and the handle occupies the lower position shown therein, the rollers will be elevated free of the platform 29 but will come into contact with the platform as it approaches the position shown in Fig. 3. Continued movement of the handle into the position shown in Fig. 5 causes the rollers to move along the platform 29 imparting longitudinal movement to the valve stem 21 thereby moving the rotor to the open position shown in Fig. 5.

Pressure is applied to the rotor in the closed position thereof by means of an index ring designated generally by 65 positioned on the top of the platform 29 by means of bolts such as 66, carrying springs such as 67 in the spring casings 31 to 34 and threaded into the index ring. The bolts 66 have a sliding fit in the platform and the springs act between the lower side of the platform and the head of the bolts so that the index ring is held to the platform under spring tension but is held against rotation thereon. The index ring has a plurality of annularly spaced slots such as shown at 68, 69, and 71, shaped to receive an arcuate arm 72 on the handle to designate the positions of the valve corresponding with the ports in the rotor and stator members. The index ring also has an inwardly extending flange 73 adapted for the reception of an index ring plate 74 against its lower side, the plate being held in position by pins 75 passing through the side of the ring. The index ring plate is provided with a rectangular opening 76 through which the handle passes and with stiffening ribs 77 and 78 along the sides of the opening as shown in Figs. 8 and 9. The lower side of the plate is provided with ways 79 and 81 for reception of the rollers 61 and 62 and with stops 82 for limiting the movement of the rollers to determine the closed position of the handle 35. Thus the rollers 61 and 62 lie between the platform 29 and the index ring plate 74. When the handle 35 is moved from the position shown in Fig. 3, in which the rotor occupies its closed position and the rollers are free between the plate and the platform, into the position of Fig. 5, the rollers bear against the platform and raise the rotor. When the arm 72 is disengaged from the slot in the index ring, the handle may be indexed, turning the index ring plate 74, the stem 21 and the rotor 15 to bring about port combinations. When the handle is moved from the position of Fig. 3 to the position of Fig. 1, the rollers are lifted into contact with the index ring plate and lift the index ring 65 against the pressure of the springs 67 thereby applying pressure between the rotor and the resilient seat. When the rollers pass beyond the centerline of the stem 21, the pressure of the springs forces the rollers against the stops 82 limiting further movement of the handle and holding the rotor in the closed position under pressure.

Referring again to the port arrangement, it will be seen that where the opening 39 of the stator is connected to a source of incoming water, as in water softening, the water would normally flow through the port 43 whenever the rotor occupied the open position. Thus water would be flowing under full pressure across the face of the stator during the entire time required to shift the stator from position to position. To avoid this and to obtain certain other added advantages, I have provided a cut off valve located in the port 43 as shown in Figs. 6 and 7. This consists of a plate 83 carrying on its upper surface a gasket 84 adapted to bear against the end of the ferrule in the port 43 to prevent the flow of water therethrough. A shank 85 extends through the ferrule and has radial ribs 86 to 88 for guiding the valve in its movement in the ferrule. A screw 89 is positioned in the free end of the shank for contact with the end of the valve stem 21 which acts to maintain the cut off valve open against the incoming liquid when the rotor is closed. When the rotor is opened the pressure of the incoming liquid causes the cut off valve to close in an obvious manner. The stem 85 also carries an annular flange 91 received within the ferrule as shown in Fig. 6. This flange has a plurality of V shaped notches 92 which serve to allow the passage of decreasing flow of fluid as the cut off valve moves to its closed position, thus preventing sharp closing of the cut off valve and eliminating the water hammer associated therewith.

Fig. 13 shows a modification of the seat or gasket, which is of the same general form as seat 91. In this instance the resilient material 93 has incorporated within its body the sheet of rigid material, such as metal, 94. This rigid material is formed to provide the supports 95 and 96 for the resilient material about the ports. The flange 97 and annular rib 98 increase the stiffness of the piece for the purpose further described. The screw 99 passes through a hole in plate 97 and threads into the stator member 14. Tension of this screw, combined with the pressure of housing 16, previously described, holds seat 93 in sealed relation to stator 14. This modification avoids the necessity for ferrules, as rings 95 and 96 provide both support for the resilient material about the ports and the stiffness required for effective seals about the ports. While Fig. 13 illustrates a stiffening plate within the body of the resilient seat, it is apparent that the plate may take various positions and forms and may be partially or entirely outside the resilient seat. The rigid plate offers an alternative to the ferrule means for accomplishing sealing against leakage, alignment of ports, and support for the port walls of the resilient material.

Attention is directed to the advantages of the various features of the invention. I have provided improved means for applying pressure to the rotor and for relieving the pressure prior to the lifting thereof wherein a plurality of springs are employed located outside the valve housing as a result of which the valve is not solely dependent upon the operation of one spring and the springs are not subjected to the action of the water or other liquid within the housing. Furthermore the tension of the springs may be adjusted at will without disturbing the valve. In addition this location of the spring allows for unlimited travel of the stem and rotor to operate supplementary mechanism such as the cut off valve. The pressure is relieved from the stem prior to the lifting of the rotor which makes for ease of operation. Through this means the valve is adapted to large sizes where it would otherwise be impossible by hand power to overcome the spring pressure in raising the rotor. This arrangement also allows for the use of greater spring pressure than would otherwise be practical and as a result the valve may be used for hot liquids where a harder seat is necessary.

The ferrules are rigid means for sealing the seat to the face of the stator which provides for positive operation and seals the connection against leakage. The ferrules also serve to maintain the seat and ports in proper alignment and prevent flexing of the rubber away from the rotor under the seating pressure.

In the drawings and the above description, reference has been confined to attachment of the seat means to the stator member of the valve. It is obvious that the same results can be secured by attachment of the seat to the rotor member.

The cut off valve acts to stop the flow of fluid when the rotor and stator are separated to save the liquid which would normally be thus wasted. The cut off valve is so arranged as to eliminate water hammer when this valve closes. The cut off valve is open momentarily as the rotor is moved between its open and closed position whereby to flush off the seat and carry away any sediment which may collect around the rings on the rotor.

An important advantage of the cut off valve lies in the fact that it allows the flow of fluid through the valve to be completely stopped without providing a separate valve. Thus in certain types of domestic softeners in which salt is placed directly in the head of the softener, the flow of incoming water may be cut off merely by raising the lever 35 and separating the rotor and stator members.

I claim:

1. In a valve comprising a multi-ported body member, a ported valve member rotatable to different positions relative to the body member and adapted to be unseated prior to rotation from one position to another, a stem extending from the valve member for unseating, turning and reseating the same, spring means mounted on the body member and arranged to exert pressure on the valve stem to hold the valve seated, and a manually operable member for actuating the valve stem, said member being so related to the spring means and valve stem in one position thereof to transmit the pressure of the spring means to the valve stem when the valve member is seated, but being arranged in another position to transmit the spring pressure to the body member.

2. In a valve comprising a multi-ported body member, a ported valve member rotatable to different operative positions relative to the body member and adapted to be unseated prior to rotation from one position to another, a stem extending from the valve member for unseating, turning and reseating the same, spring means mounted on the body member and arranged to exert pressure on the valve stem to hold the valve seated, a manually operable member for actuating the valve stem, said member being so related to the spring means and valve stem in one position thereof to transmit the pressure of the spring means to the valve stem when the valve member is seated, but being arranged in another position to transmit the spring pressure to the body member, and means for preventing turning of the valve stem when said manually operable member is in the first-mentioned position, said valve stem being rotatable when the manually operable member is in the other position.

3. The combination in a rotary plate-type valve of a stator member carrying a housing and having a plurality of ports, a rotor member within the housing having ports for registry with said stator ports to establish different communication between the ports of the stator in different positions of the rotor, a stem carrying the rotor movable longitudinally to seat and unseat the rotor and rotatable to shift the rotor for registry with different stator ports, a manually operated member pivoted to the stem for rotation about a transverse axis thereon to seat and unseat the rotor and rotatable about a longitudinal axis to rotate the stem and rotor, contact members on the manually operated member spaced from said transverse axis, and spring pressed means so positioned with respect to said contact members as to be engaged thereby when the manually operable member is moved to seat the rotor and to be disengaged as said member is moved to unseat the rotor, whereby the spring pressure on the rotor, stem, and manually operated member is relieved for unseating the rotor.

4. A valve as set forth in claim 3 wherein said contact members comprise rollers and said spring pressed means comprises a plate spring pressed against the housing in the unseated position of the rotor and positioned to be engaged by said rollers in the seated position of the rotor to transfer the spring pressure from the housing to the rotor in the seated position thereof.

5. The combination in a rotary plate-type valve of a stator member carrying a housing and having a plurality of ports, a rotor member within the housing having ports for registry with said first mentioned ports to establish different communication between the ports of the stator in different positions of the rotor, means for moving the stator in establishing different port connections and valve means in one of said stator ports for automatically closing said port when the rotor is moved away from the stator.

6. A valve of the character recited in claim 5 wherein said valve means includes a valve head so related to said port as to seat against the annulus of said port under the action of incoming fluid and a valve stem extending through the port so related to the rotor as to contact therewith during movement of the rotor toward the stator, to open said valve.

7. In a plate type valve, the combination of a ported body member, a ported stem plate adapted to effect different communication between the ports in the body member in different positions of the plate, a cover on the body member enclosing the plate, one of the ports in the body member being a pressure port and normally communicating with the inside of the cover, means for unseating and reseating the plate to change communication between ports in the body member, and a valve for automatically closing the port in the unseating of the plate.

8. In a plate type valve, the combination of a ported body member, a ported stem plate adapted to effect different communication between the ports in the body member in different positions of the plate, a cover on the body member enclosing the plate, one of the ports in the body member being a pressure port and normally communicating with the inside of the cover, means for shifting the plate to different operative positions, and means for automatically closing the pressure port when the plate is moved out of an operative position.

9. The combination in a rotary plate-type valve of a stator member carrying a housing and having a plurality of ports, a rotor member within the housing having ports for registry with said stator ports to establish different communications between the stator ports in different positions of the rotor, means for moving the rotor in seating and unseating movement with respect to the stator in establishing different port connections, seats surrounding the ports of one of said members for contact with the other of said members in the seated position of the rotor, said seats being of a resilient material normally tending to flex into the port area and recede from the other of said members under the seating pressure, and means acting between said one of said members and the seats for sealing the seats against the said member and for maintaining substantial alignment between the walls of the ports and the walls of the seat under the seating pressure of the rotor, said last mentioned means comprising ferrules seated into the ports of one of said members, said ferrules having flanges extending transversely from the body of the ferrule and engaging said seats to retain the seat against said member.

10. A valve as recited in claim 9 wherein said last mentioned means comprise ferrules threaded into the ports of said member having flanges recessed on the lower side thereof adjacent to the ferrules to provide annular undercut shoulders for engagement with said seats circumferentially of said ports.

11. A valve as recited in claim 9 wherein said seats comprise a single sheet of resilient material having openings registering with the ports of said member and the last mentioned means comprise ferrules threaded into said ports having flanges provided with undercut faces for engagement with said sheet circumferentially of said ports, said faces preventing creeping of the sheet under the pressure of the ferrule.

ARTHUR L. RICHE.

Disclaimer 2,047,131.—*Arthur L. Riche*, Freeport, Ill. MULTIPORT PLATE TYPE VALVE. Patent dated July 7, 1936. Disclaimer filed Aug. 23, 1948, by the assignees, *Automatic Pump & Softener Corporation*, and *Lee G. Daniels*.

Hereby enter this disclaimer to claims 1, 2, 5, 7, and 8 of said patent.

[*Official Gazette September 14, 1948.*]

transfer the spring pressure from the housing to the rotor in the seated position thereof.

5. The combination in a rotary plate-type valve of a stator member carrying a housing and having a plurality of ports, a rotor member within the housing having ports for registry with said first mentioned ports to establish different communication between the ports of the stator in different positions of the rotor, means for moving the stator in establishing different port connections and valve means in one of said stator ports for automatically closing said port when the rotor is moved away from the stator.

6. A valve of the character recited in claim 5 wherein said valve means includes a valve head so related to said port as to seat against the annulus of said port under the action of incoming fluid and a valve stem extending through the port so related to the rotor as to contact therewith during movement of the rotor toward the stator, to open said valve.

7. In a plate type valve, the combination of a ported body member, a ported stem plate adapted to effect different communication between the ports in the body member in different positions of the plate, a cover on the body member enclosing the plate, one of the ports in the body member being a pressure port and normally communicating with the inside of the cover, means for unseating and reseating the plate to change communication between ports in the body member, and a valve for automatically closing the port in the unseating of the plate.

8. In a plate type valve, the combination of a ported body member, a ported stem plate adapted to effect different communication between the ports in the body member in different positions of the plate, a cover on the body member enclosing the plate, one of the ports in the body member being a pressure port and normally communicating with the inside of the cover, means for shifting the plate to different operative positions, and means for automatically closing the pressure port when the plate is moved out of an operative position.

9. The combination in a rotary plate-type valve of a stator member carrying a housing and having a plurality of ports, a rotor member within the housing having ports for registry with said stator ports to establish different communications between the stator ports in different positions of the rotor, means for moving the rotor in seating and unseating movement with respect to the stator in establishing different port connections, seats surrounding the ports of one of said members for contact with the other of said members in the seated position of the rotor, said seats being of a resilient material normally tending to flex into the port area and recede from the other of said members under the seating pressure, and means acting between said one of said members and the seats for sealing the seats against the said member and for maintaining substantial alignment between the walls of the ports and the walls of the seat under the seating pressure of the rotor, said last mentioned means comprising ferrules seated into the ports of one of said members, said ferrules having flanges extending transversely from the body of the ferrule and engaging said seats to retain the seat against said member.

10. A valve as recited in claim 9 wherein said last mentioned means comprise ferrules threaded into the ports of said member having flanges recessed on the lower side thereof adjacent to the ferrules to provide annular undercut shoulders for engagement with said seats circumferentially of said ports.

11. A valve as recited in claim 9 wherein said seats comprise a single sheet of resilient material having openings registering with the ports of said member and the last mentioned means comprise ferrules threaded into said ports having flanges provided with undercut faces for engagement with said sheet circumferentially of said ports, said faces preventing creeping of the sheet under the pressure of the ferrule.

ARTHUR L. RICHE.

Disclaimer 2,047,131.—*Arthur L. Riche*, Freeport, Ill. MULTIPORT PLATE TYPE VALVE. Patent dated July 7, 1936. Disclaimer filed Aug. 23, 1948, by the assignees, *Automatic Pump & Softener Corporation*, and *Lee G. Daniels*.

Hereby enter this disclaimer to claims 1, 2, 5, 7, and 8 of said patent.

[*Official Gazette September 14, 1948.*]

Disclaimer 2,047,131.—*Arthur L. Riche*, Freeport, Ill. MULTIPORT PLATE TYPE VALVE. Patent dated July 7, 1936. Disclaimer filed Aug. 23, 1948, by the assignees, *Automatic Pump & Softener Corporation*, and *Lee G. Daniels*.

Hereby enter this disclaimer to claims 1, 2, 5, 7, and 8 of said patent.

[*Official Gazette September 14, 1948.*]